United States Patent
Hum et al.

(10) Patent No.: US 8,151,096 B2
(45) Date of Patent: Apr. 3, 2012

(54) METHOD TO IMPROVE BRANCH PREDICTION LATENCY

(75) Inventors: Herbert Hum, Portland, OR (US); Hongliang Gao, Orlando, FL (US)

(73) Assignee: Intel Corporation, Santa Clara, CA (US)

( * ) Notice: Subject to any disclaimer, the term of this patent is extended or adjusted under 35 U.S.C. 154(b) by 752 days.

(21) Appl. No.: 12/187,126

(22) Filed: Aug. 6, 2008

(65) Prior Publication Data

US 2010/0037036 A1 Feb. 11, 2010

(51) Int. Cl.
 *G06F 7/38* (2006.01)
 *G06F 9/00* (2006.01)
 *G06F 9/44* (2006.01)

(52) U.S. Cl. .................................. 712/239; 712/240

(58) Field of Classification Search ................ 712/239
See application file for complete search history.

(56) References Cited

OTHER PUBLICATIONS

Tarjan et al., "Revisiting the Perceptron Predictor Again", Sep. 2004.*
Tarjan et al., "Merging Path and Gshare Indexing in Perceptron Branch Prediction", Sep. 2005.*
Inoue et al., "A History-Based I-Cache for Low-Energy Multimedia Applications", Aug. 2002.*
Jimenez, D.A., "Reconsidering Complex Branch Predictors", In the Proceedings of the 9th International Symposium on High-Performance Computer Architecture, pp. 43-52, 2003.
Seznec, A. and Fraboulet, A., "Effective ahead pipelining of instruction block address generation", In the Proceedings of the 30th annual International Symposium on Computer Architecture, pp. 241-252, 2003.
Seznec A., Jourdan S., Sainrat P., and Michaud P., "Multiple-block ahead branch predictors", In the Proceedings of the 7th International Conference on Architectural Support for Programming Languages and Operating Systems, pp. 116-127, 1996.

* cited by examiner

*Primary Examiner* — Chun-Kuan Lee
*Assistant Examiner* — Jesse R Moll
(74) *Attorney, Agent, or Firm* — Trop, Pruner & Hu, P.C.

(57) ABSTRACT

An apparatus to generate a branch prediction of an instruction based at least in part on the address of the previous branch instruction, wherein the previous instruction is prior to the instruction in a program order. The prediction can also based on a branch history value with respect to the previous branch instruction and one or more previous branch predictions.

23 Claims, 9 Drawing Sheets

PRIOR ART

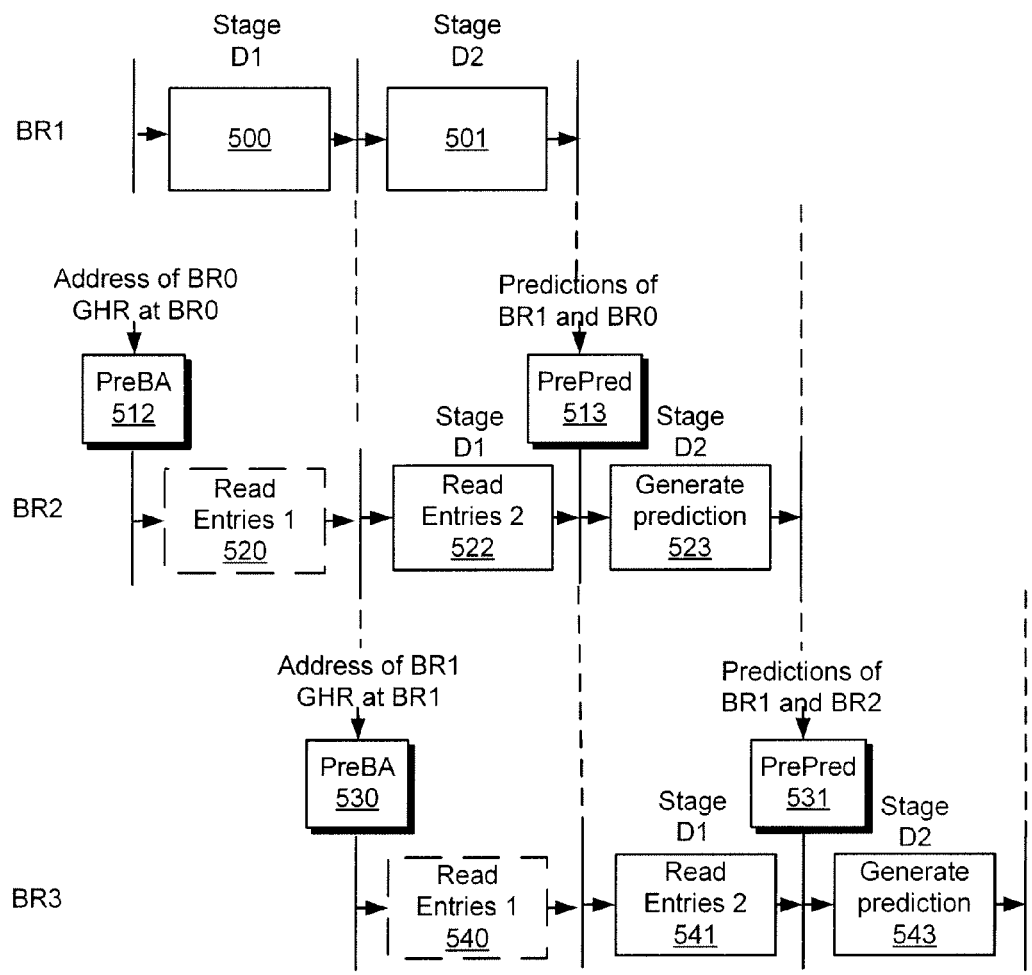

Figure 5b

| Index 1 | Entry1 | Entry2 | Entry3 | Entry4 |
|---|---|---|---|---|
| | | | | |
| | | | | |
| ⋮ | ⋮ | ⋮ | ⋮ | ⋮ |
| | | | | |
| | | | | |

560 (table)

550, 551, 552, 553, 554 (columns)

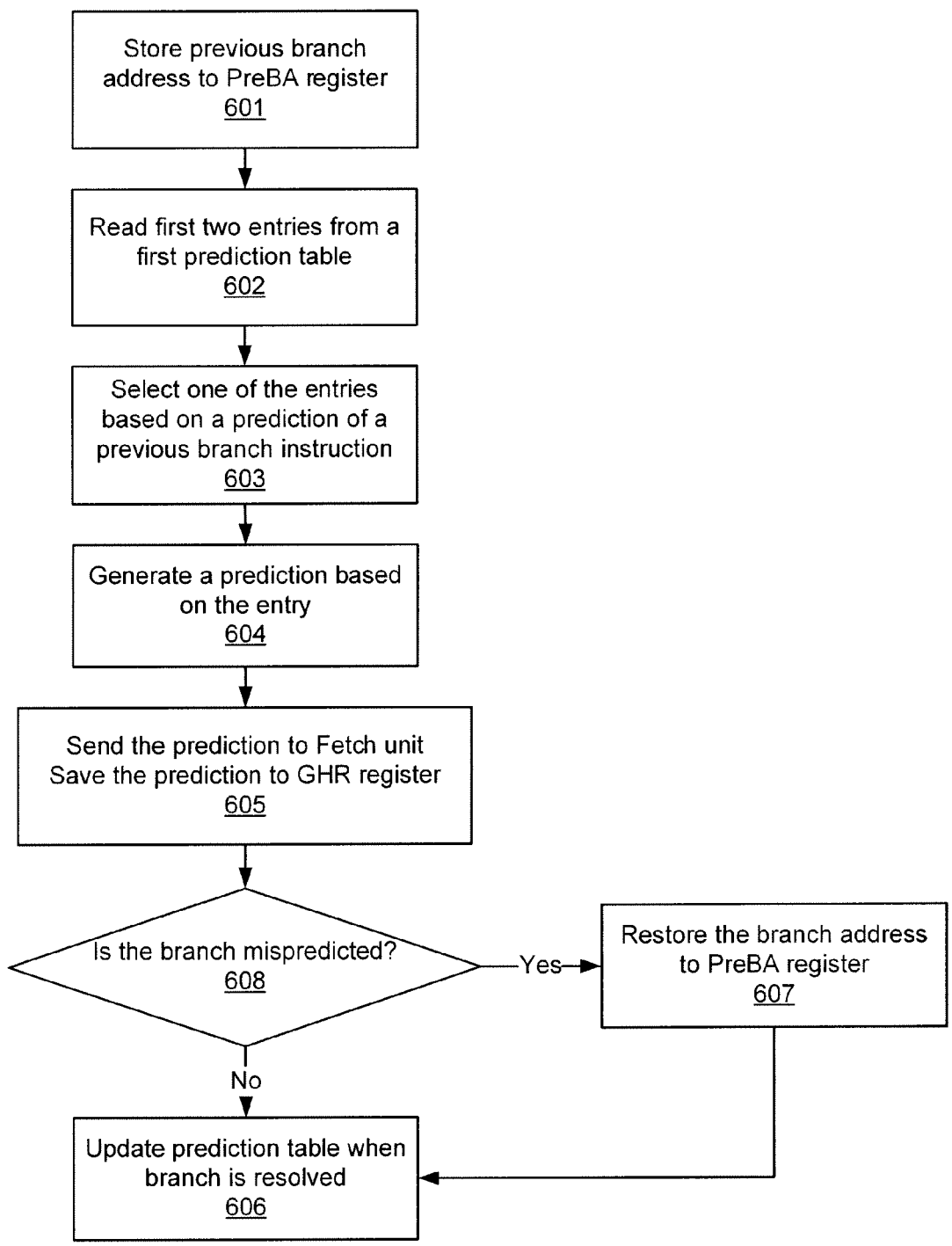

US 8,151,096 B2

METHOD TO IMPROVE BRANCH PREDICTION LATENCY

FIELD OF THE INVENTION

The invention relates to the field of high performance computer design, more particularly to branch prediction.

BACKGROUND OF THE INVENTION

To improve performance, some processors may utilize branch prediction. For example, when a computer processor encounters an instruction with a conditional branch, branch prediction may be used to predict whether the conditional branch will be taken and subsequently causes retrieval of the predicted instruction rather than waiting for the current instruction to be resolved. To improve branch prediction accuracy, branch predictors often use large prediction tables and complex algorithms that make the branch prediction latency longer than one clock cycle. In addition to that, adding pipeline stages in view of the longer latency requirement eventually reduces the performance gain of branch predictors.

For example, a study using a cycle accurate simulator (CAS) of a processor shows that one additional clock cycle in branch prediction latency during a decoding process resulted in a 0.5% performance loss. Therefore reducing branch prediction latency while trying to attain high accuracy for branch prediction is very valuable.

FIG. 1 shows a branch predictor known in prior art. Referring to FIG. 1, D1 indicates the first decoding stage, D2 indicates the second decoding stage, and D3 indicates the third decoding stage. The address of the branch instruction is available at the end of the first decoding stage. The branch predictor as shown has a prediction latency of two clock cycles. Thus, one additional decoding stage (D3) is required to complete branch prediction process 101 as shown in FIG. 1. The predicted address in this branch predictor is available at the end of D3 stage. In comparison to a simple branch predictor with single-cycle prediction latency, the predicted address is available at the end of D2 stage. The one cycle loss as a result of the prediction latency may cause undesirable performance loss.

BRIEF DESCRIPTION OF THE DRAWINGS

The present invention is illustrated by way of example and is not limited by the figures of the accompanying drawings, in which like references indicate similar elements, and in which:

FIG. 5a is a block diagram of one embodiment of a branch predictor with a prediction latency of three pipeline stages.

FIG. 5b illustrates one embodiment of a prediction table.

FIG. 6 is a flow diagram of one embodiment of a process to perform branch prediction.

DETAILED DESCRIPTION OF THE INVENTION

Embodiments of methods and systems for branch prediction are described. In the following description, numerous specific details are set forth. However, it is understood that embodiments may be practiced without these specific details. In other instances, well-known elements, specifications, and protocols have not been discussed in detail in order to avoid obscuring the present invention.

In one embodiment, a previous branch address and a branch history value are used during a branch prediction process for a current branch instruction. The prediction of the current branch instruction can be generated earlier than when the current branch address is used during the branch prediction process.

Figure 2:
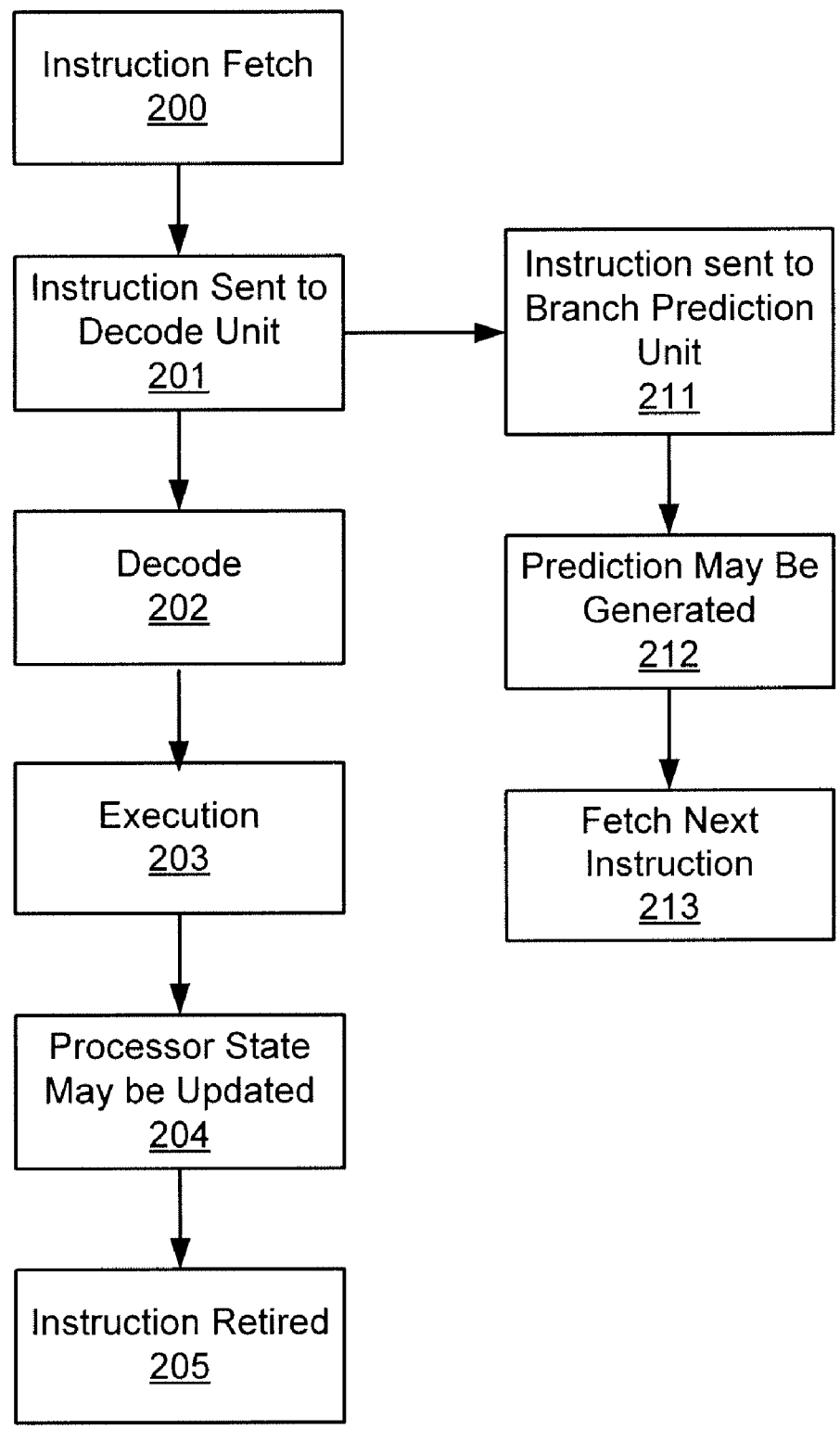
FIG. 2 is a flow diagram of one embodiment of a process to execute computer instructions.

FIG. 2 is a flow diagram of one embodiment of a process to execute computer instructions. In one embodiment, a fetch unit of a processor fetches the instruction from a memory interface unit (processing block 200). In one embodiment, the fetch unit sends the instruction to a decode unit (processing block 201). In processing block 202, the decode unit decodes the instruction into micro-operations (micro-ops). Decoding the instruction also provides a determination of whether or not the instruction is a branch instruction.

In one embodiment, the decode unit also sends the branch instruction to a branch prediction unit (processing block 211) which may return a predicted target address with regard to this branch instruction (processing block 212). If a branch prediction unit predicts a target address, the target address (the address of a next instruction) is provided to the fetch unit, which then fetches the instruction at the predicted target address (processing block 213).

In one embodiment, the branch prediction (processing blocks 211 and 212) takes place substantially simultaneously as processing block 202. In one embodiment, the instruction is fetched from the predicted target address (processing block 213) substantially simultaneously as processing block 202 or processing block 203.

In one embodiment, the decode unit sends the micro-ops to the corresponding instruction execution unit or units to be executed (processing block 203). The results of the executions may cause the processor state to be updated (processing block 204). Any operand affected by the execution of an instruction is written to a register or a memory (or a cache). Any instruction which is executed as a result following a branch prediction is not retired until the predicted branch instruction is resolved and it is determined that the prediction is correct. The instruction is retired after all other dependency issues are resolved (processing block 205).

In one embodiment, the branch prediction unit also compares the actual direction of a branch instruction (the result of a branch execution unit) to the prediction of the branch instruction and determines if the prediction is correct (processing block 204). If a target was predicted correctly, the processor continues with the predicted instruction in the pipeline. If the branch prediction is not correct, the processor changes the execution sequence as per the actual direction and the pipeline has to be flushed.

Figure 3:
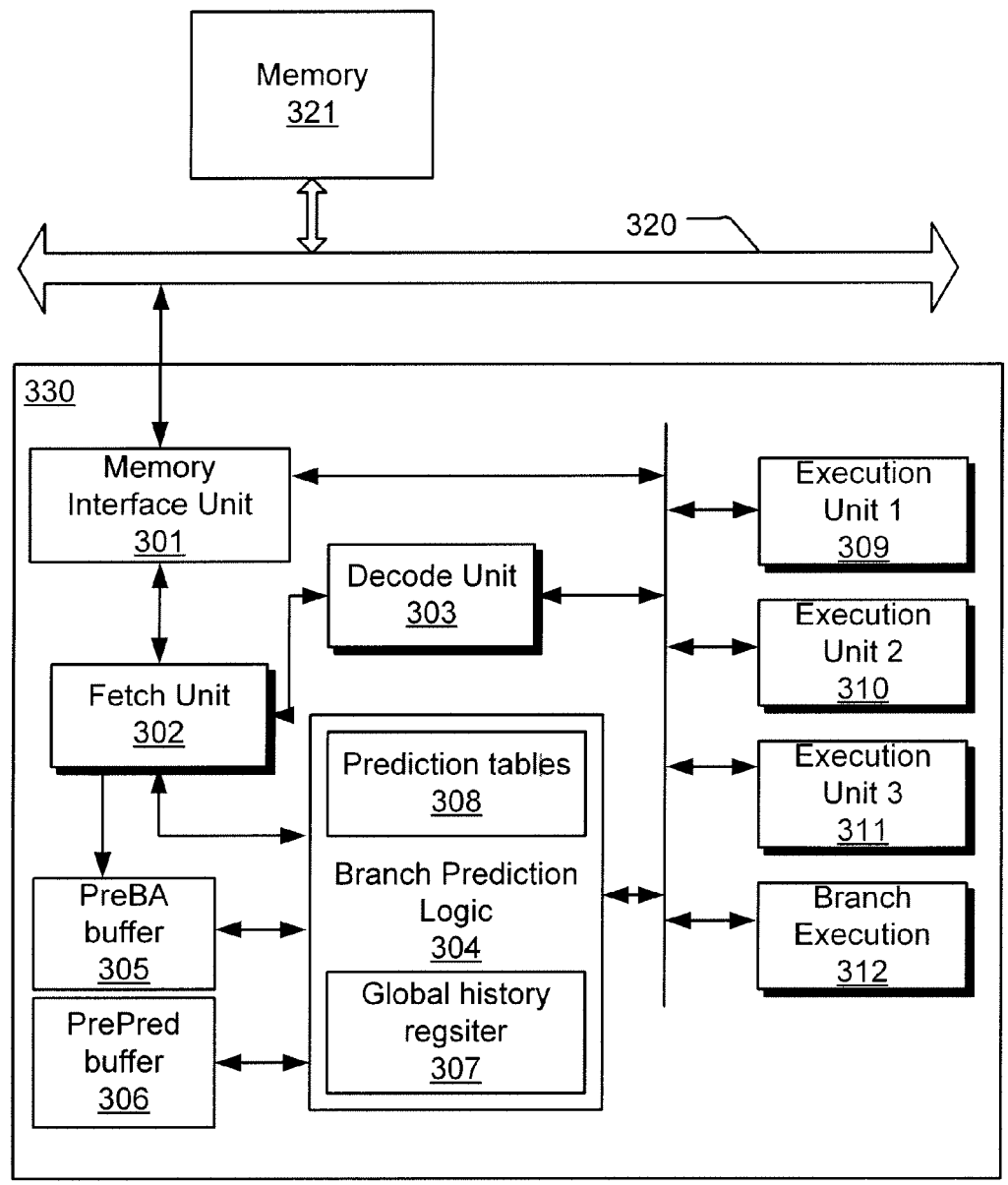
FIG. 3 is a block diagram illustrating one embodiment of a computer system.

FIG. 3 is a block diagram illustrating one embodiment of a computer system. In one embodiment, the computer system includes processor 330, memory 321, and computer bus 320. Processor 330 further includes memory interface unit 301, fetch unit 302, decode unit 303, PreBA buffer 305, PrePred buffer 306, execution units 309-311, branch execution unit 312, and branch prediction logic 304.

In one embodiment, processor 330 interfaces with memory 321, providing non-permanent storage of data and program instructions. Memory interface unit 301 transfers data and instructions between memory 321 and processor 330. Fetch unit 302 obtains particular instructions from memory interface unit 301. Decode unit 303 determines the type of an instruction and divides the instruction into one or more micro-ops. Execution units 309-311 execute micro-ops. Branch execution unit 312 executes micro-ops associated with branch instructions. Branch prediction logic 304 provides predictions and target addresses of branch instructions if available.

While in this exemplary embodiment branch prediction logic 304 is a distinct unit implemented in hardware, it should be appreciated that alternate embodiments may involve other implementations of branch prediction logic 304. For example, the functions of branch prediction logic 304 may be distributed among different units within a processor.

In one embodiment, branch prediction logic 304 further comprises prediction tables 308 and global history register 307. Global history register 307 stores the history of branch predictions for a number of past branch instructions. In one embodiment, global history register 307 is an N-bit shift register that stores branch directions (after execution) of N previous branch instructions. Branch prediction logic 304 can derive a global history value (GHR value) by using the entire global history register 307 or by using a number of bits from global history register 307. In one embodiment, branch prediction logic 304 also interfaces with PreBA buffer 305 and PrePred buffer 306. PreBA buffer 305 stores a branch address of a previous branch instruction. In one embodiment, PreBA buffer 305 stores a portion of a previous branch address. PrePred buffer 306 keeps track of one or more previous branch predictions. PrePred buffer 306 provides information to select one entry out from a subset of entries retrieved from prediction tables 308 during a branch prediction process. The functions of PreBA buffer 305 and PrePred buffer 306 will be described in further detail below with additional references to the remaining figures.

In one embodiment, prediction tables 308 are indexed according to a portion of a branch address stored in PreBA buffer 305 and/or a global history value. Prediction tables 308 may include prediction fields which indicate whether it is more likely that the branch instruction being evaluated will be resolved to be taken, or will be resolved to be not taken. It will be appreciated by those of ordinary skill in the art that any one or a combination of branch prediction approaches may be used in accordance with the embodiment to determine the prediction information to be stored in prediction tables 308.

In one embodiment, when a branch prediction is provided by branch prediction logic 304, fetch unit 302 fetches the predicted target which then enters the pipeline. If it is later determined that an instruction predicted to be taken was not in fact a taken branch, or was not in fact a branch instruction at all, the pipeline is flushed such that the mispredicted target and any instructions that followed it into the pipeline are removed from the pipeline, along with any associated data. In one embodiment, a misprediction may occur in a number of ways: an instruction predicted to be a branch may not in fact be a branch; an instruction predicted to be a taken branch is not in fact taken (or vice versa); and a branch target address may be wrong. For some instructions, a misprediction may be known as early as the decode stage of a pipeline.

Figure 4A:
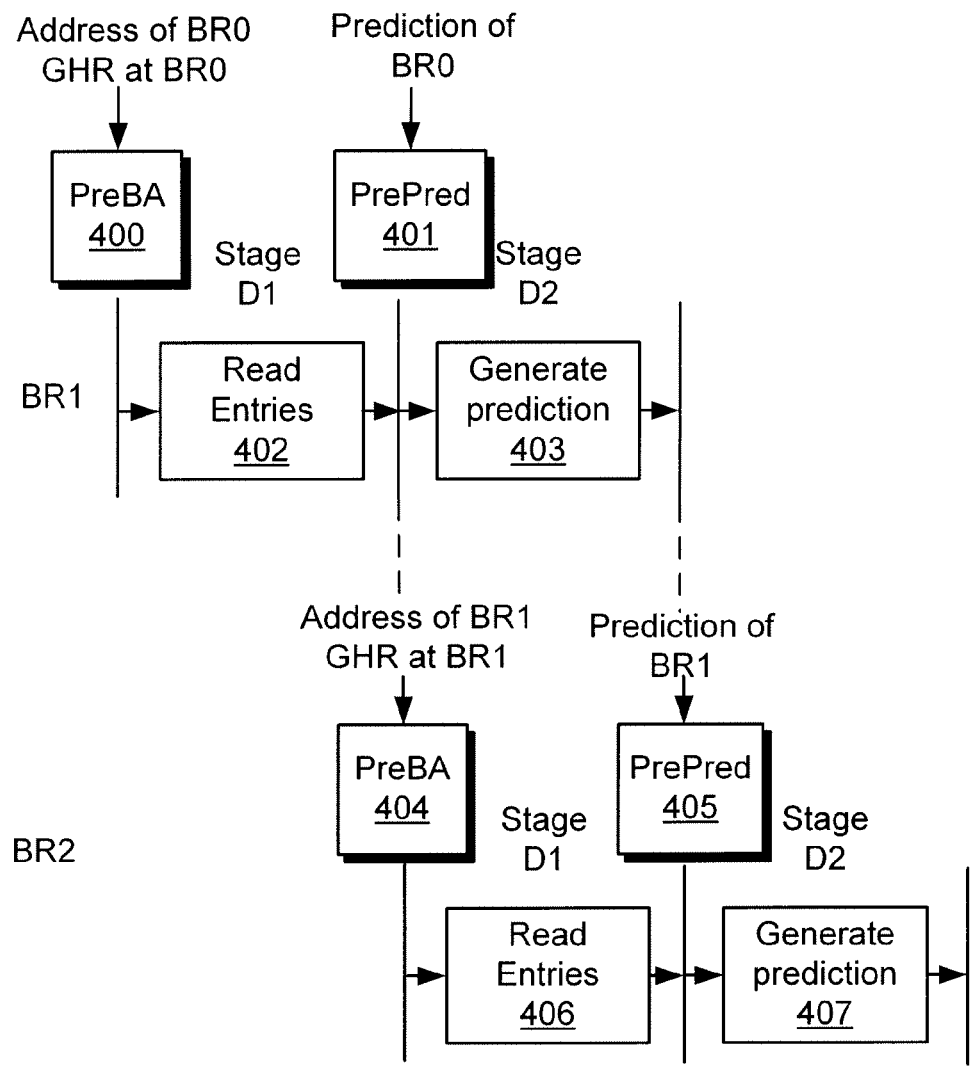
FIG. 4a is a block diagram of one embodiment of a branch predictor with a prediction latency of two pipeline stages.

FIG. 4a is a block diagram of one embodiment of a branch predictor with a prediction latency of two pipeline stages. Referring to FIG. 4a, D1 indicates the first decoding stage and D2 indicates the second decoding stage. In this embodiment, the branch address of a branch instruction is available at the end of the first decoding stage (D1) of the branch instruction. The prediction latency is two which implies the prediction process takes the time of two pipeline stages to execute. A prediction made with respect to a branch instruction is available at the end of the second cycles of decoding stages (D2).

Figure 1:
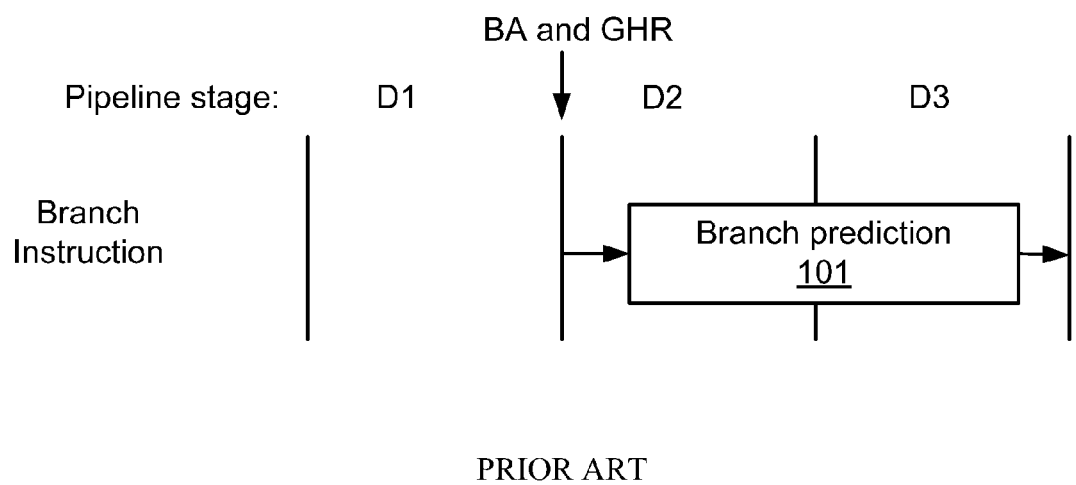
FIG. 1 is a branch predictor known in the art.

In one embodiment, in order to hide the latency introduced by the additional decoding stage (as shown in FIG. 1), the branch address of a previous branch instruction and a global history value with respect to the previous branch instruction are used for generating a prediction of the current branch instruction. The branch prediction process can therefore begin even before the current branch address is available.

In one embodiment, PreBA buffer 404 is updated with the branch address (or a part thereof) of the previous branch instruction whenever the branch address is available at the end of D1 stage. Therefore, when a branch instruction is entering its D1 stage, PreBA buffer 404 stores the address of a previous branch instruction. In one embodiment, PreBA buffer 404 stores only a portion of a previous branch address. PrePred buffer 405 is used to store the prediction of the previous branch instruction which is available at the end of D2 stage of the previous branch instruction. In one embodiment, PrePred buffer 405 is a 1-bit register.

Referring to FIG. 4a, the prediction process shows two back-to-back branch instructions, BR1 and BR2. In one embodiment, the GHR value is determined with respect to a branch instruction. For example, the GHR value at BR0 is the latest GHR value when BR0 is at its D1 stage when neither the prediction of BR0 nor the actual direction of BR0 is known yet.

This example shows generating a prediction of branch instruction BR2. At the end of D1 stage of BR1, the branch address of BR1 is available and is updated to PreBA buffer 404. At the same time, BR2 is entering its D1 stage. The branch predictor uses the content in PreBA buffer 404 (the branch address portion of BR1) and the latest GHR value at BR1 as an index to read two adjacent entries from prediction table 420 during D1 stage of BR2 (read entries 406).

Figure 4B:
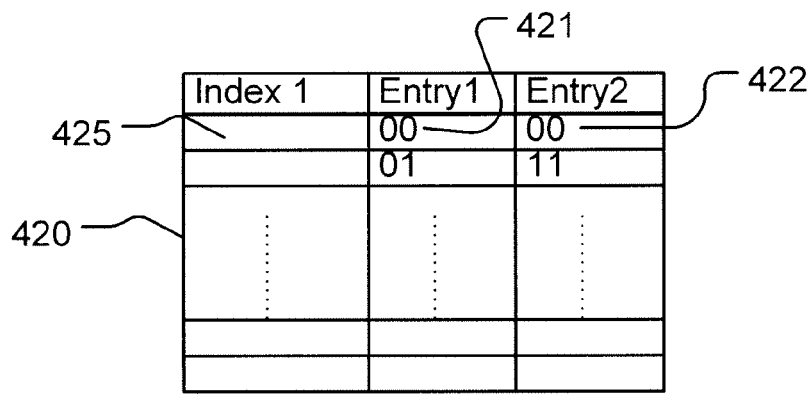
FIG. 4b illustrates one embodiment of a prediction table.

FIG. 4b shows an exemplary embodiment of a prediction table. For example, entry 421 and entry 422 are read from prediction table 420 if the index points to line 425. At the end of D1 stage of BR2, the prediction of BR1 is available and is stored in PrePred buffer 405. In D2 stage of BR2, branch predictor uses the value stored in PrePred buffer 405 (the prediction of BR1) to select one entry from the two entries (entry 421 and entry 422). Subsequently, the branch predictor generates the prediction of BR2 based on the selected entry (generate prediction 407).

In one embodiment, each entry in prediction table 420 is a 2-bit value representing a 2-bit bimodal saturation counter value. In one embodiment, each entry is a 1-bit value indicating whether a branch is taken or not. It will be appreciated by those of ordinary skill in the art that any one or a combination of branch prediction approaches may be used in accordance with the embodiment to determine the prediction information to be stored in each entry of prediction tables 420.

In one embodiment, a branch predictor refers to multiple prediction tables where each prediction table stores various prediction information organized in a similar way as prediction table 420. The branch predictor generates a prediction based on information from multiple prediction tables in conjunction with other logic processing. It will be appreciated by those of ordinary skill in the art that, the branch predictor can combine one or more branch prediction methods known in the art such as local branch prediction, global gshare prediction, and global gselect prediction in accordance with the embodiment.

A similar example can be deduced for generating a prediction of BR1. The branch predictor begins reading from prediction table 420 at D1 stage of BR1 (read entries 402) and then generates a prediction (generate prediction 403) in D2 stage of BR1 after the prediction of previous branch instruction BR0 (not shown) is stored in PrePred buffer 401. In one embodiment, PreBA buffer 400 and PreBA buffer 404 are the same buffer but are shown separately to illustrate that the content of the buffer is updated at a different time according to the branch instruction that is being decoded in the pipeline. Similarly, PrePred buffer 401 and PrePred buffer 405 are the same buffer.

In one embodiment, a line predictor that generates a prediction in one cycle is used in conjunction with the branch predictor. The prediction generated by the line predictor will be overridden if it does not match the prediction from the branch predictor.

FIG. 5a is a block diagram of one embodiment of a branch predictor with a prediction latency of three pipeline stages.

Referring to FIG. 5a, D1 indicates the first decoding stage and D2 indicates the second decoding stage. The branch address of a branch instruction is available at the end of the first decoding stage (D1) of the branch instruction. The prediction latency is three which implies that the prediction process takes the time of three pipeline stages to execute. A prediction made with respect to a branch instruction is available at the end of the second cycles of decoding stages (D2).

FIG. 5a illustrates an example of three back-to-back branch instructions, BR1, BR2, and BR3. With reference to a specific example of BR3, in one embodiment, a prediction process of BR3 begins before BR3 enter its D1 stage. PreBA buffer 530 is updated with the branch address of the second previous branch instruction (BR1) which is available at the end of D1 stage of BR1 (before read entries 540). In one embodiment, PreBA buffer 530 stores only a portion of a previous branch address. PrePred buffer 531 stores the predictions of two previous branch instructions (BR1 and BR2) which are available at the end of D2 of the BR1 and at the end of D2 of BR2 respectively. In one embodiment, PrePred buffer 531 is a 2-bit register.

In one embodiment, the GHR value is determined with respect to a branch instruction. For example, the GHR value at BR1 is the GHR value when BR1 is at its D1 stage when neither the prediction of BR1 nor the actual direction of BR1 is known yet.

For generating the prediction of BR3, in one embodiment, the branch address of BR1 is available and is updated to PreBA buffer 530 at the end of D1 stage of BR1 (block 500). The branch predictor uses the content in PreBA buffer 530 (a branch address portion of BR1) and the GHR value at BR1 as an index to read four adjacent entries from prediction table 560 (shown in FIG. 5b). For example, referring to FIG. 5b, entries 551-554 will be read if the index points to line 550. In one embodiment, reading a prediction table takes two pipeline stages (read entries 540 and read entries 541). In one embodiment, a second prediction table is accessed after the first prediction table. Each prediction table takes one pipeline stage to execute a read access each. (read entries 504 and read entries 541 respectively).

In one embodiment, the predictions of BR1 and BR2 are available in PrePred buffer 531 at the end of D1 stage of BR3. In D2 stage of BR3, the branch predictor uses the 2-bit value stored in PrePred buffer 531 (the prediction of BR1 and the prediction of BR2) to select one entry from the four entries (entries 551-554) and subsequently the branch predictor generates the prediction of BR3 based on the selected entry value. In one embodiment, entry 551 is selected if the 2-bit value is "00", entry 552 is selected if the 2-bit value is "01", entry 553 is selected if the 2-bit value is "10", and entry 554 is selected if the 2-bit value is "11".

In one embodiment, each entry in prediction table 560 is a 2-bit value representing a 2-bit bimodal saturation counter value. In one embodiment, each entry is a 1-bit value indicating whether a branch is taken or not. It will be appreciated by those of ordinary skill in the art that any one or a combination of branch prediction approaches may be used in accordance with the embodiment to determine the prediction information to be stored in each entry of prediction tables 560.

In one embodiment, a branch predictor refers to multiple prediction tables. Each prediction table stores various prediction information organized in a similar way as prediction table 560. The branch predictor generates a prediction based on information selected from the multiple prediction tables in conjunction with other logic processing. It will be appreciated by those of ordinary skill in the art that, the branch predictor can combine one or more branch prediction methods known in the art such as local branch prediction, global gshare prediction, and global gselect prediction in accordance with the embodiment.

In one embodiment, a line predictor that generates a prediction in one cycle is used in conjunction with the branch predictor. The prediction generated by the line predictor is overridden if it does not match the prediction from the branch predictor. The line predictor can generate a fast prediction when the branch prediction is unable to generate a prediction within a time constraint due to resource contention, such as multiple branch predictions trying to access the same prediction table. In another embodiment, a prediction table can have duplicate copies thereof to serve concurrent read accesses.

A similar example is shown for generating a prediction of BR2. In one embodiment, to generate the prediction of BR2, the branch predictor begins reading from prediction table 560 before D1 stage of BR1 (block 500) using the branch address of BR0 (stored in PreBA buffer 512) and GHR value at BR0. The branch predictor uses two clock cycles to read from prediction tables (read entries 520 and read entries 522). The branch predictor then generates a prediction (generate prediction 523) in D2 stage of BR2 after the predictions of previous branch instructions (BR0 and BR1) are available in PrePred 513. The prediction of BR1 is ready after D2 stage of BR1 (block 501) as shown in the FIG. 5a.

In one embodiment, PreBA buffer 512 and PreBA buffer 530 are the same buffer but are shown separately to illustrate that the content of the buffer is updated at a different time according to the branch instruction that is being decoded in the pipeline. Similarly, in one embodiment, PrePred buffer 513 and PrePred buffer 531 are the same buffer. In one embodiment, more than one buffer can be used to avoid resource contention. In one embodiment, for a multi-threading environment, each thread has a separate set of registers and buffers.

In one embodiment, hiding a branch prediction with N-cycle latency can be performed when there are at least N−1 stages before the branch address of a branch instruction is known. In one embodiment, the branch address is known at the end of D1 stage of a branch instruction. To hide N-cycle prediction latency of the branch instruction, the prediction process begins by using the (N−1)the previous branch address. PreBA buffer stores the address of the (N−1)the previous branch address at least before the (N−2) stage(s) prior to D1 stage of the branch instruction. In one embodiment, PreBA buffer stores only a portion of the address of the (N−1)the previous branch address. The branch predictor will read $2^{(N-1)}$ entries from each prediction table. The intermediate predictions between the (N−1)th previous branch instruction and the previous branch instruction forms a (N−1)-bit vector. The (N−1)-bit vector (stored in PrePred buffer) is used to select one entry from each set of $2^{(N-1)}$ entries. These selected entries are used to generate the branch prediction in D2 stage of the current branch instruction.

FIG. 6 is a flow diagram of one embodiment of a process to perform branch prediction. It will be appreciated by those of ordinary skill in the art that each operations may be performed in one or more clock cycles of one or more stages in a pipeline. Additionally, some of the operations may be performed concurrently when no prevailing dependency is detected.

In one embodiment, the process is performed by processing logic that may comprise hardware (circuitry, dedicated logic, etc.), software (such as is run on a general purpose computer system or a dedicated machine), or a combination of both. Referring to FIG. 6, the process begins by processing logic stores a previous branch address to a PreBA buffer (processing block 601). Then, processing logic reads two entries from each prediction table (processing block 602) based on a portion of the previous branch address and a global history value with respect to the previous branch instruction. Once the prediction of the previous branch instruction is generated, processing logic selects one of the two entries (for each prediction table) based on the prediction of the previous branch instruction (processing block 603). The processing logic then generates a prediction based on the selected entries in conjunction with other logic processing (processing block 604).

In one embodiment, a next instruction is fetched (processing block 605) based on the prediction and a predicted target address. When the branch instruction is eventually executed (processing 608), the processing logic determines if the actual direction of the branch instruction matches the prediction made earlier (processing block 608).

In one embodiment, if the branch prediction is correct, the processing logic updates the prediction tables in accordance to their algorithms respectively (processing block 606). If the branch prediction is not correct, processing logic will perform a misprediction recovery (processing block 607). During the misprediction recovery, the processing logic restores PreBA buffer with the address of the mispredicted branch instruction. The processing logic will use the address as an index to read from the prediction tables for generating a branch prediction of the next branch instruction. The processing logic also stores the actual direction of the mispredicted branch into PrePred buffer at the location where the corresponding prediction was previously stored therein. The content of PrePred buffer will be used for generating a prediction of the next branch instruction.

In one embodiment, the misprediction recovery only requires information such as, the address of the mispredicted branch. The misprediction recovery requires no other large amount of check point information such as temporary results from reading a prediction table or snapshots of a global history register for every branch prediction.

In one embodiment, processing logic also updates prediction tables accordingly while recovering from the mispredicted branch instruction (processing block 606). In one embodiment, the prediction tables are updated using the index based on the previous branch address which is available at the retirement stage in a pipeline.

Embodiments of the invention may be implemented in a variety of electronic devices and logic circuits. Furthermore, devices or circuits that include embodiments of the invention may be included within a variety of computer systems.

Embodiments of the invention may also be included in other computer system topologies and architectures.

Figure 7:
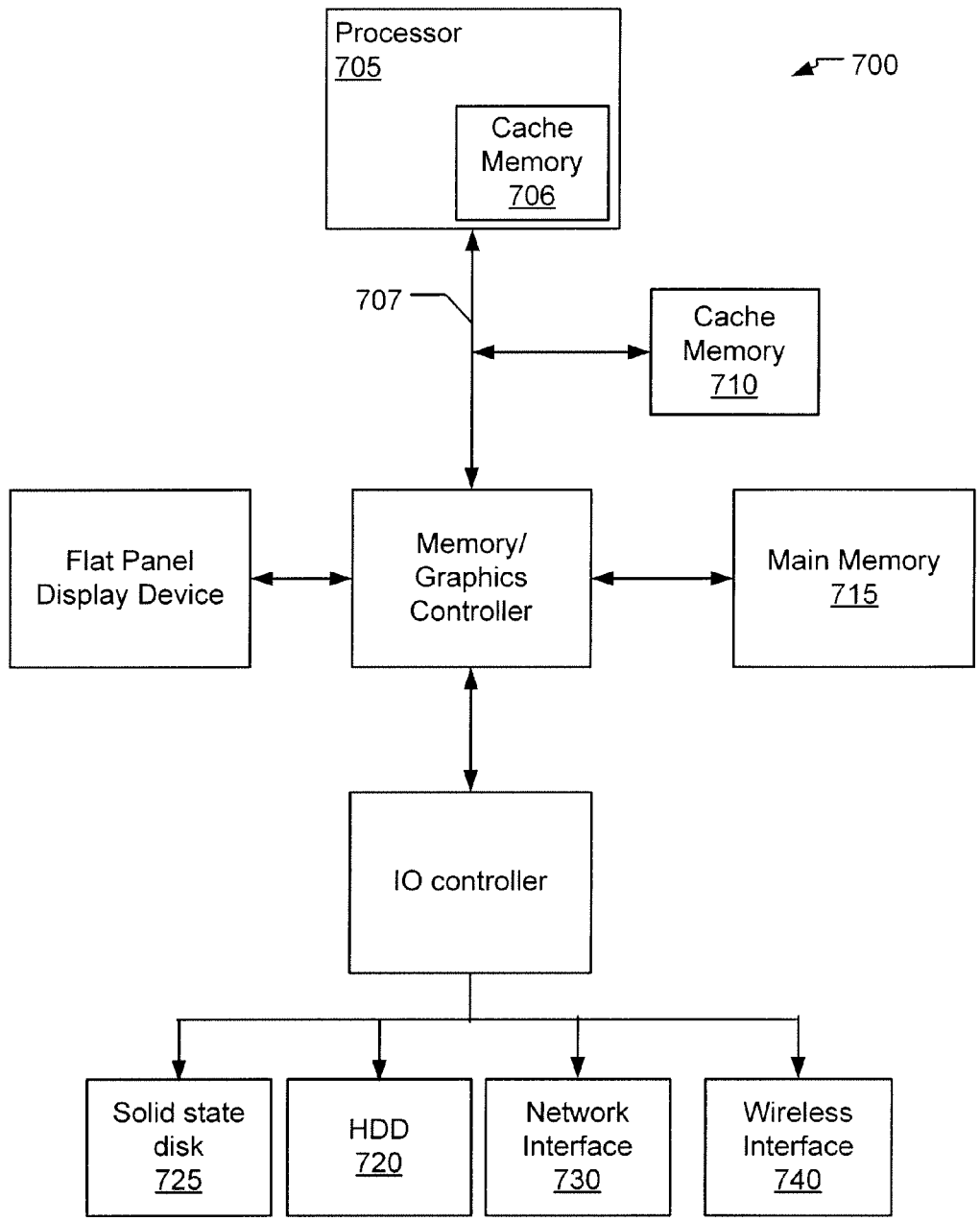
FIG. 7 illustrates a computer system in which one embodiment of the invention may be used.

FIG. 7, for example, illustrates a front-side-bus (FSB) computer system in which one embodiment of the invention may be used. A processor 705 accesses data from a level 1 (L1) cache memory 706, a level 2 (L2) cache memory 710, and main memory 715. In one embodiment, the cache memory 706 may be a multi-level cache memory comprise of an L1 cache together with other memory such as an L2 cache within a computer system memory hierarchy and cache memory 710 are the subsequent lower level cache memory such as an L3 cache or more multi-level cache. Furthermore, the computer system may have the cache memory 710 as a shared cache for more than one processor core. The processor 705 may have any number of processing cores.

The main memory 715 may be implemented in various memory sources, such as dynamic random-access memory (DRAM), a hard disk drive (HDD) 720, a solid state disk 725 based on NVRAM technology, or a memory source located remotely from the computer system via network interface 730 or via wireless interface 740 containing various storage devices and technologies. The cache memory may be located either within the processor or in close proximity to the processor, such as on the processor's local bus 707. Furthermore, the cache memory may contain relatively fast memory cells, such as a six-transistor (6T) cell, or other memory cell of approximately equal or faster access speed.

Other embodiments of the invention, however, may exist in other circuits, logic units, or devices within the system of FIG. 7. Furthermore, in other embodiments of the invention may be distributed throughout several circuits, logic units, or devices in the form of hardware, software, or some combination thereof as illustrated in FIG. 7.

Figure 8:
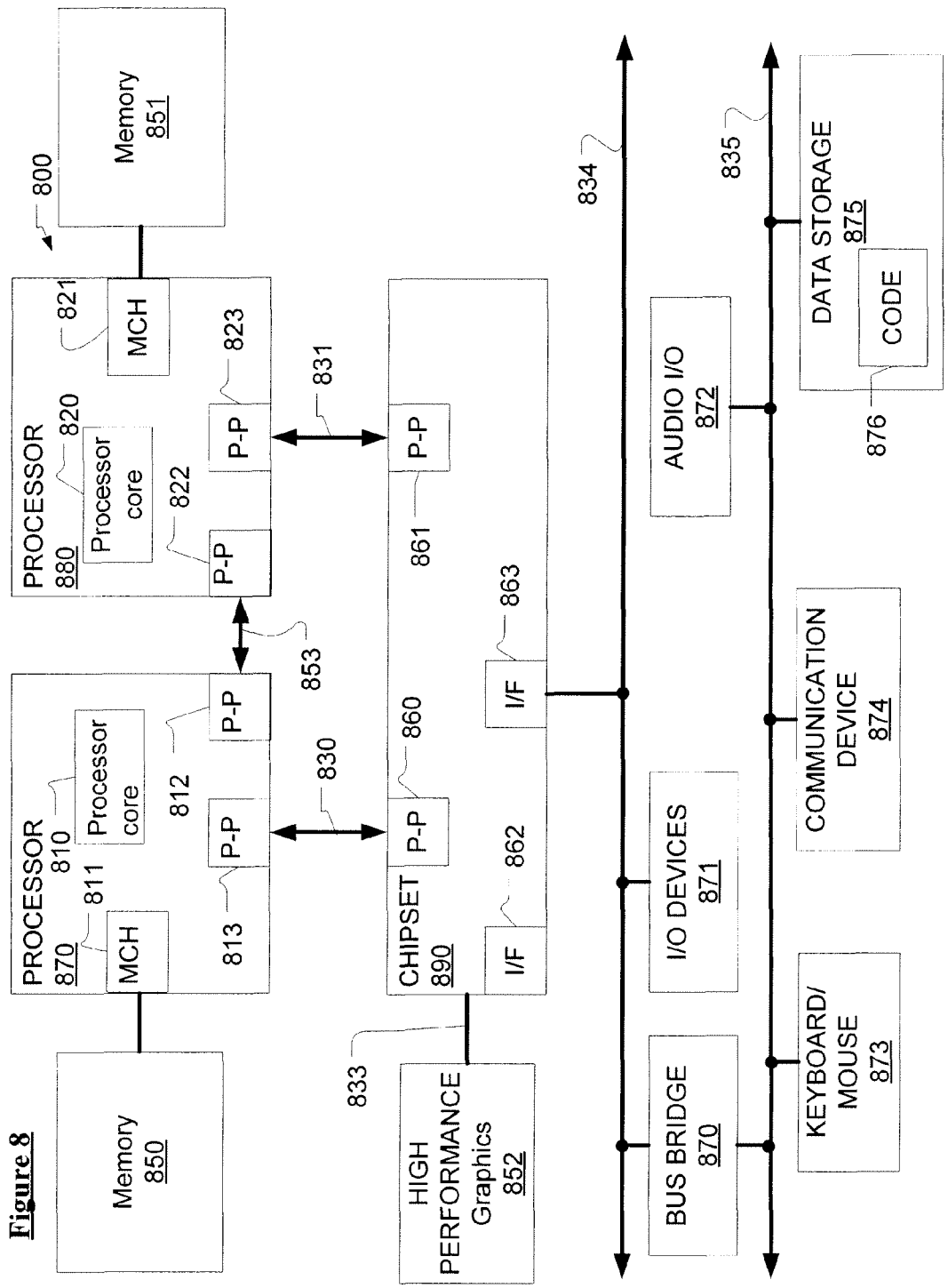
FIG. 8 illustrates a point-to-point computer system in which one embodiment of the invention may be used.

Similarly, at least one embodiment may be implemented within a point-to-point computer system. FIG. 8, for example, illustrates a computer system that is arranged in a point-to-point (PtP) configuration. In particular, FIG. 8 shows a system where processors, memory, and input/output devices are interconnected by a number of point-to-point interfaces.

The system of FIG. 8 may also include several processors, of which only two, processors 870, 880 are shown for clarity. Processors 870, 880 may each include a local memory controller hub (MCH) 811, 821 to connect with memory 850, 851. Processors 870, 880 may exchange data via a point-to-point (PtP) interface 853 using PtP interface circuits 812, 822. Processors 870, 880 may each exchange data with a chipset 890 via individual PtP interfaces 830, 831 using point to point interface circuits 813, 823, 860, 861. Chipset 890 may also exchange data with a high-performance graphics circuit 852 via a high-performance graphics interface 862. Embodiments of the invention may be coupled to computer bus (834 or 835), or within chipset 890, or coupled to data storage 875, or coupled to memory 850 of FIG. 8.

Other embodiments of the invention, however, may exist in other circuits, logic units, or devices within the system of FIG. 8. Furthermore, in other embodiments of the invention may be distributed throughout several circuits, logic units, or devices illustrated in FIG. 8.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A processor comprising:
a fetch unit to fetch instructions from a memory;
a first buffer to store one or more branch predictions corresponding to one or more branch instructions including a first instruction;
a second buffer to store at least a part of an address of the first instruction; and
a branch prediction logic to generate a branch prediction of a second instruction based at least in part on the address of the first instruction, wherein the first instruction is prior to the second instruction in a program order, wherein the branch prediction logic will restore at least the part of the address of the first instruction to the second buffer if the first instruction is mispredicted, wherein the branch prediction logic will replace a branch prediction corresponding to the first instruction in the first buffer with an actual direction of the first instruction, wherein the actual direction is used to generate the branch prediction of the second instruction without using check point information if the first instruction is mispredicted.

2. The processor defined in claim 1, wherein the branch prediction of the second instruction is further based on the one or more branch predictions and a branch history value with respect to the first instruction.

3. The processor defined in claim 1, wherein the branch prediction logic comprises a prediction table to store a first plurality of prediction entries, wherein the prediction table is accessed using a branch history value with respect to the first instruction and at least the part of the address of the first instruction without using a part of an address of the second instruction.

4. The processor defined in claim 3, wherein the branch prediction logic is operable to update an actual direction of the second instruction to the prediction table.

5. The processor defined in claim 1, wherein a prediction process of a second instruction begins before a decoding process of the second instruction begins.

6. The processor defined in claim 1, wherein the branch prediction of the second instruction is available by the end of a second clock cycle of a decoding process of the second instruction.

7. The processor defined in claim 1, wherein a prediction process of the second instruction is N clock cycles in length, the first instruction is a (N-1)th branch instruction prior to the second instruction in the program order, wherein N is an integer larger than 1.

8. The processor defined in claim 7, wherein the branch prediction logic stores at least the part of the address of the first instruction to the second buffer at least (N-2) clock cycles before a decoding process of the second instruction begins.

9. The processor defined in claim 7, wherein the first buffer can store at least (N-1) branch predictions corresponding to the one or more plurality of instructions.

10. The processor defined in claim 7, wherein at least $2^{N-1}$ entries from a prediction table are accessed, based at least in part on the address of the first instruction and a branch history value with respect to the first instruction, before a decoding process of a second instruction begins.

11. A method to perform branch prediction comprising:
reading a first plurality of entries from a first prediction table based at least in part on an address of a first branch instruction and a branch history value with respect to the first branch instruction;
selecting a first entry from the first plurality of entries based at least on a branch prediction of the first branch instruction;
generating a branch prediction of a second branch instruction based at least on the first entry, wherein the first branch instruction is prior to the second branch instruction in a program order;
replacing the branch prediction of the first branch instruction into a first buffer with an actual direction of the first branch instruction if the first branch instruction is mispredicted, wherein the actual direction is used to generate the branch prediction of the second instruction without using check point information; and
restoring at least the part of the address of the first branch instruction to a second buffer if the first branch instruction is mispredicted.

12. The method defined in claim 11, further comprising:
storing one or more branch predictions that correspond to one or more branch instructions including the first branch instruction to the first buffer; and
storing at least a part of the address of the first branch instruction to the second buffer.

13. The method defined in claim 11, further comprising:
updating the first prediction table if an actual direction of the second branch instruction is available.

14. The method defined in claim 11, wherein the reading and the selecting are performed without using a part of an address of the second branch instruction.

15. The method defined in claim 11, further comprising:
decoding the second branch instruction over multiple clock cycles, wherein the branch prediction of the second branch instruction is available before the end of a second clock cycle of the multiple clock cycles.

16. The method defined in claim 11, further comprising:
reading a second plurality of entries from a second prediction table based at least in part on the address of the first branch instruction and the branch history value with respect to the first branch instruction; and
selecting a second entry from the second plurality of entries based at least on the branch prediction of the first branch instruction, wherein the branch prediction of the second branch instruction is generated based at least on the first entry and the second entry.

17. The method defined in claim 12, wherein the reading, the selecting and the generating operations altogether is N clock cycles in length, wherein the first branch instruction is a (N-1)th branch instruction prior to the second branch instruction in the program order, wherein N is an integer larger than 1.

18. The method defined in claim 17, further comprising:
decoding the second branch instruction, wherein the storing at least the part of the address of the first branch instruction to the second buffer is performed at least (N-2) clock cycles before the decoding of the second branch instruction begins.

19. The method defined in claim 17, wherein the first buffer can store at least (N-1) branch predictions.

20. The method defined in claim 17, wherein at least $2^{N-1}$ entries from the prediction table are accessed.

21. A system for branch prediction comprising:
an instruction fetch unit to receive instructions from a memory;
an instruction decoding unit to decode the instruction;
a first register to store one or more branch predictions corresponding to one or more branch instructions including a first branch instruction;

a second register to store at least a part of an address of the first branch instruction; and a branch prediction unit to generate a branch prediction of a second instruction based at least in part on the address of the first branch instruction, wherein the first branch instruction is prior to the second instruction in a program order, wherein the branch prediction unit will restore at least the part of the address of the first branch instruction to the second register if the first branch instruction is mispredicted, wherein the branch prediction unit will replace a branch prediction corresponding to the first branch instruction in the first register with an actual direction of the first instruction, wherein the actual direction is used to generate the branch prediction of the second instruction without using check point information if the first instruction is mispredicted.

22. The system defined in claim 21, wherein the branch prediction of the second instruction is further based on the one or more branch predictions and a branch history value with respect to the first branch instruction.

23. The system defined in claim 21, wherein the branch prediction unit comprises a prediction table to store a plurality of prediction entries, wherein the prediction table is accessed using a branch history value with respect to the first branch instruction and at least the part of the address of the first branch instruction without using a part of an address of the second instruction.

* * * * *